United States Patent
O'Docherty

[19]

[11] Patent Number: 6,095,551
[45] Date of Patent: Aug. 1, 2000

[54] NON-INFLATABLE CURTAIN WITH INFLATABLE DEVICE

[75] Inventor: James K. O'Docherty, Mesa, Ariz.

[73] Assignee: TRW Inc., Lyndhurst, Ohio

[21] Appl. No.: 09/366,094

[22] Filed: Aug. 2, 1999

[51] Int. Cl.$^7$ ................................................. B60R 21/22
[52] U.S. Cl. .................................. 280/730.2; 280/730.1; 280/749; 280/753
[58] Field of Search ............................. 280/730.1, 730.2, 280/748, 749, 751, 753

[56] References Cited

U.S. PATENT DOCUMENTS

| | | |
|---|---|---|
| 3,687,485 | 8/1972 | Campbell . |
| 5,265,903 | 11/1993 | Kuretake et al. . |
| 5,322,322 | 6/1994 | Bark et al. . |
| 5,333,898 | 8/1994 | Stutz . |
| 5,462,308 | 10/1995 | Seki et al. . |
| 5,480,181 | 1/1996 | Bark et al. . |
| 5,588,672 | 12/1996 | Karolow et al. . |
| 5,660,414 | 8/1997 | Karolow et al. . |
| 5,707,075 | 1/1998 | Kraft et al. . |
| 5,788,270 | 8/1998 | Haland et al. . |
| 5,865,462 | 2/1999 | Robins et al. . |

*Primary Examiner*—Eric Culbreth
*Attorney, Agent, or Firm*—Tarolli, Sundheim, Covell, Tummino & Szabo L.L.P.

[57] ABSTRACT

Apparatus (10) for helping to protect an occupant of a vehicle (12) that has a side structure (18) and a roof (28) includes a non-inflatable curtain (14). The non-inflatable curtain (14) is deployable in a first direction away from the vehicle roof into a position between the side structure of the vehicle and a vehicle occupant. The non-inflatable curtain (14), when deployed, extends fore and aft in the vehicle (12) along the side structure (18) of the vehicle. An inflatable device (16) is inflatable into a position between the side structure (18) of the vehicle (12) and a vehicle occupant. First and second tethers (68 and 72) connect the inflatable device (16) to the non-inflatable curtain (14). An inflation fluid source (24) provides inflation fluid to inflate the inflatable device (16). The inflatable device (16), when inflated, tensions the first and second tethers (68 and 72) to deploy the non-inflatable curtain (14) in the first direction. The inflatable device (16), when inflated, resists movement of the non-inflatable curtain (14) away from the side structure (18) of the vehicle (12).

13 Claims, 1 Drawing Sheet

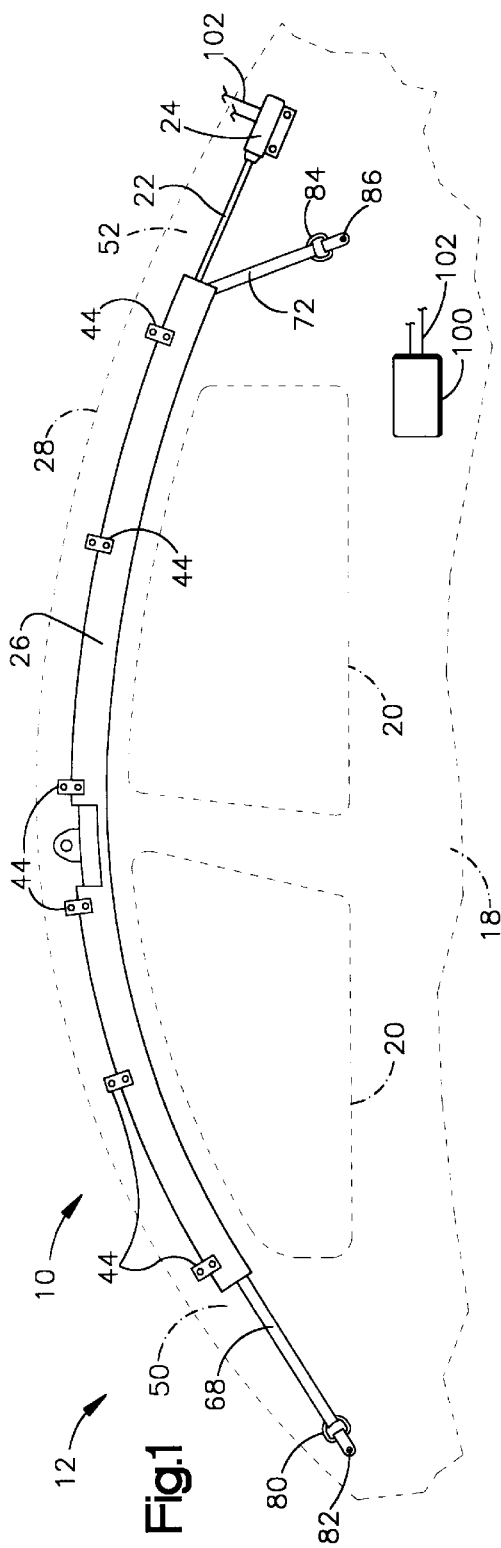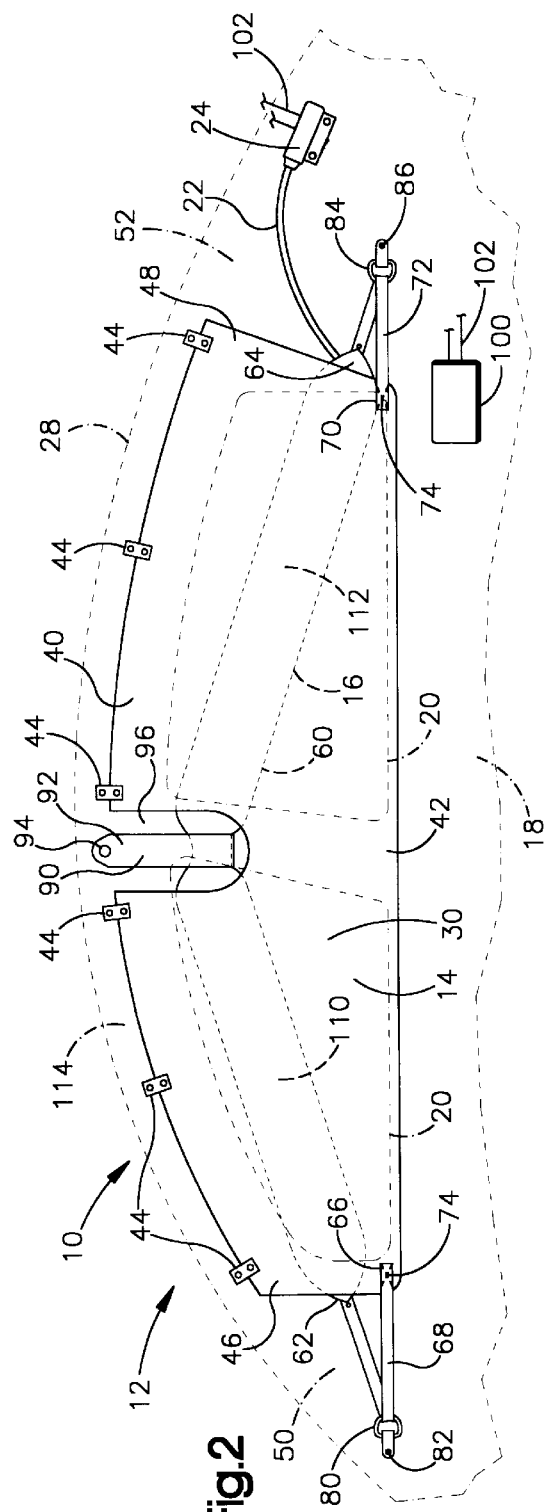

6,095,551

NON-INFLATABLE CURTAIN WITH INFLATABLE DEVICE

FIELD OF THE INVENTION

The present invention relates to a vehicle occupant protection device o helping protect a vehicle occupant in the event of a side impact to a vehicle and/or a vehicle rollover.

BACKGROUND OF THE INVENTION

It is known to deploy a non-inflatable vehicle occupant particular type of non-inflatable vehicle occupant protection device is a side curtain. Such a non-inflatable side curtain deploys from the roof of the vehicle downward inside the passenger compartment between a vehicle occupant an d the side structure of the vehicle in the event of a side impact or rollover. An inflatable side curtain is also known. Such an inflatable side curtain is inflated from a deflated condition by inflation fluid from an inflator.

SUMMARY OF THE INVENTION

The present invention relates to an apparatus for helping to protect an occupant of a vehicle that has a side structure and a roof. The apparatus includes a non-inflatable curtain that is deployable in a first direction away from the vehicle roof into a position between the side structure of the vehicle and a vehicle occupant. The non-inflatable curtain, when deployed, extends fore and aft in the vehicle along the side structure of the vehicle.

The apparatus also includes an inflatable device that is inflatable into a position between the side structure of the vehicle and a vehicle occupant. First and second tethers connect the inflatable device to the non-inflatable curtain. An inflation fluid source provides inflation fluid to inflate the inflatable device.

The inflatable device, when inflated, tensions the first and second tethers to deploy the non-inflatable curtain in the first direction. The inflatable device, when inflated, resists movement of the non-inflatable curtain away from the side structure of the vehicle.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic view of a vehicle safety apparatus in a stored condition; and FIG. 2 is a schematic view of the vehicle safety apparatus of FIG. 1 in an deployed condition.

DESCRIPTION OF PREFERRED EMBODIMENTS

As representative of the present invention, an apparatus 10 for helping to protect an occupant of a vehicle includes a vehicle occupant protection device. As shown in FIGS. 1 and 2, the vehicle occupant protection device comprises a non-inflatable curtain 14 (FIG. 2) and an inflatable device 16 mounted adjacent to the side structure 18 of the vehicle 12 and the vehicle roof 28. The side structure 18 of the vehicle 12 includes side windows 20. An inflator 24 is connected in fluid communication with the inflatable device 16 through a fill tube 22.

The inflator 24 contains a stored quantity of pressurized inflation fluid (not shown) in the form of a gas to inflate the inflatable device 16. The inflator 24 alternatively could contain a combination of pressurized inflation fluid and ignitable material for heating the inflation fluid, or could be a pyrotechnic inflator that uses the combustion of gas-generating material to generate inflation fluid.

The apparatus 10 includes a housing 26 (FIG. 1) that stores the non-inflatable curtain 14 and the inflatable device 16 in an undeployed condition. The fill tube 22, undeployed non-inflatable curtain 14, deflated inflatable device 16, and housing 26 have an elongated configuration and extend along the vehicle roof 28 and along the side structure 18 of the vehicle 12 above the side windows 20.

The non-inflatable curtain 14 (FIG. 2) is formed from a sheet of material that is folded over to form an outer panel (not shown) and an overlying inner panel 30. When the non-inflatable curtain 14 is in the deployed condition of FIG. 2, the outer panel is positioned adjacent the side structure 18 of the vehicle 12. The outer panel and inner panel 30 may be secured to each other at locations on the non-inflatable curtain 14, such as the perimeter of the curtain, by known means (not shown) such as stitching, adhesive bonding, or weaving. The inflatable device 16 is disposed between the outer panel and the inner panel 30.

It will be recognized by those skilled in the art that alternative constructions could be incorporated into the design of the non-inflatable curtain 14 without negatively affecting its functionality. For example, the non-inflatable curtain 14 may be formed from a sheet of material that is not folded-over and therefore includes only a single panel. In this instance, the inflatable device 16 could be positioned between the non-inflatable curtain 14 and the side structure 18 of the vehicle 12.

The non-inflatable curtain 14 has a top edge 40 and an opposite bottom edge 42. The top edge 40 is connected to the side structure 18 of the vehicle 12 adjacent to the vehicle roof 28 by fastening devices 44, such as fasteners or brackets. It will be recognized by those skilled in the art, however, that alternative fasteners may also be used. The non-inflatable curtain 14 also has a front edge 46 and an opposite rear edge 48. The front edge 46 is positioned adjacent to an A pillar 50 of the vehicle 12 and the rear edge 48 is positioned adjacent to a C pillar 52 of the vehicle 12.

The inflatable device 16 comprises an inflatable tube 60, which has a first end 62 and an opposite second end 64. The first end 62 of the inflatable tube 60 is connected by a first tether 68 to the non-inflatable curtain 14 at a location 66 adjacent to the front edge 46 and the bottom edge 42 of the curtain 14. The second end 64 of the inflatable tube 60 is connected by a second tether 72 to the non-inflatable curtain 14 at a location 70 adjacent to the rear edge 48 and the bottom edge 42 of the curtain 14. The first and second tethers 68 and 72 are connected to the non-inflatable curtain 14 by known means such as stitching 74.

The first tether 68 extends from the first end 62 of the inflatable tube 60 through a first guide member 80, such as a D-ring, to the first location 66 on the non-inflatable curtain 14. The first tether 68 is slidable through the first guide member 80. The first guide member 80 is fixed to the side structure 18 of the vehicle 12 by known means, such as a fastener, at a first location 82 on or near the A pillar 50 of the vehicle 12. The first location 82 is located forward of the front edge 46 of the non-inflatable curtain 14 as viewed relative to the direction of forward travel of the vehicle 12.

The second tether 72 extends from the second end 64 of the inflatable tube 60 through a second guide member 84, such as a D-ring, to the location 70 on the non-inflatable curtain 14. The second tether 72 is slidable through the second guide member 84. The second guide member 84 is fixed to the side structure 18 of the vehicle 12 by known means, such as a fastener, at a second location 86 on or near the C pillar 52 of the vehicle 12. The second location 86 is located rearward of the rear edge 48 of the non-inflatable curtain 14 as viewed relative to the direction of forward travel of the vehicle 12.

A support member 90 supports the inflatable tube 60 at a position on the inflatable tube 60 located approximately midway between the first and second ends 62 and 64 of the tube. In the illustrated embodiment, the support member 90 comprises a strap 92 that wraps around the inflatable tube 60 and is fixed to the side structure 18 of the vehicle 12 by known means, such as a fastener, at a location 94. The non-inflatable curtain 14 may include a cut-out portion 96 around the support member 90. The cut-out portion 96 may help to allow the inflatable tube 60 and the support member 90 to deploy without being obstructed by the non-inflatable curtain 14.

The vehicle 12 includes a sensor mechanism 100 (shown schematically in FIGS. 1 and 2) for sensing a side impact to the vehicle 12 and/or a rollover of the vehicle 12. The sensor mechanism 100 actuates the inflator 24 in response to the sensing of a side impact or a vehicle rollover.

In the event of a rollover of the vehicle or a side impact to the vehicle 12 of a magnitude greater than a predetermined threshold value, the sensor mechanism 100 provides an electrical signal over lead wires 102 to the inflator 24. The electrical signal causes the inflator 24 to be actuated in a known manner. The inflator 24 discharges fluid under pressure into the fill tube 22. The fill tube 22 directs the fluid into the inflatable tube 60.

In the deflated condition, the inflatable tube 60 has a given length and a given diameter. As the inflatable tube 60 is inflated, the diameter of the tube increases and the length of the tube decreases. Thus, when inflated, the inflatable tube 60 tensions the first and second tethers 68 and 72, which pull on the non-inflatable curtain 14. As a result, the housing 26 (FIG. 1) opens, and the non-inflatable curtain 14 and the inflatable tube 60 are deployed into the position illustrated in FIG. 2. The non-inflatable curtain 14 and the inflatable tube 60 are deployed in a direction away from the vehicle roof 28 and downward as viewed relative to the direction of forward travel of the vehicle 12.

The non-inflatable curtain 14 and inflatable tube 60, when deployed, extend fore and aft in the vehicle 12 along the vehicle side structure 18 and are positioned between the side structure 18 and any occupant of the vehicle 12. The non-inflatable curtain 14 and the inflatable tube 60, when deployed, help to protect a vehicle occupant in the event of a vehicle rollover or a side impact to the vehicle 12.

In the illustrated embodiment, a first portion 110 of the inflatable tube 60 extends in a generally diagonal direction from the support member 90 towards the first location 82. A second portion 112 of the inflatable tube 60 extends in a generally diagonal direction from the support member towards the second location 86. The first and second portions 110 and 112 of the inflated tube 60 are thus positioned between a vehicle occupant and an area of the side structure 18 which includes the vehicle windows 20 and a portion of a roof rail 114 of the vehicle 12.

When the inflatable tube 60 is inflated, the first and second tethers 68 and 72 tension the non-inflatable curtain 14 along the bottom edge 42 of the curtain. Thus, the inflatable tube 60, when inflated, helps to resist movement of the non-inflatable curtain 14 away from the side structure 18 of the vehicle 12. Those skilled in the art will recognize, however, that it may be desirable to apply a tension to the non-inflatable curtain 14 in the downward direction in which the curtain 14 is deployed. In this instance, the first and second locations 82 and 86 may be positioned below the bottom edge 42 of the deployed non-inflatable curtain 14. As a result, the inflatable tube 60, when inflated, would tension the non-inflatable curtain 14 in a downward direction as shown in the drawings and with respect to the direction of forward travel of the vehicle 12.

From the above description of the invention, those skilled in the art will perceive improvements, changes and modifications. For example, the illustrated embodiment depicts the non-inflatable curtain 14 and inflatable device 16 as extending from the A pillar 50 of the vehicle 12 to the C pillar 52 of the vehicle. Those skilled in the art will recognize that it may be desirable to configure the curtain and inflatable device to extend from the A pillar to a D pillar (not shown) of the vehicle. Such improvements, changes and modifications within the skill of the art are intended to be covered by the appended claims.

Having described the invention, the following is claimed:

1. Apparatus for helping to protect an occupant of a vehicle that has a side structure and a roof, said apparatus comprising:

a non-inflatable curtain that is deployable in a first direction away from the vehicle roof into a position between the side structure of the vehicle and a vehicle occupant, said non-inflatable curtain when deployed extending fore and aft in the vehicle along the side structure of the vehicle;

an inflatable device that is inflatable into a position between the side structure of the vehicle and a vehicle occupant, said inflatable device having a first end and an opposite second end;

a first tether connecting said first end of said inflatable device to said non-inflatable curtain;

a second tether connecting said second end of said inflatable device to said non-inflatable curtain; and an inflation fluid source for providing inflation fluid to inflate said inflatable device;

said inflatable device being free from connections to said non-inflatable curtain between said first and second ends of said inflatable device;

said inflatable device when inflated tensioning said first and second tethers to deploy said non-inflatable curtain in said first direction, said inflatable device when inflated resisting movement of said non-inflatable curtain away from the side structure of the vehicle.

2. Apparatus as defined in claim 1, wherein said inflatable device when inflated extends from an A pillar of the vehicle to a C pillar of the vehicle.

3. Apparatus as defined in claim 1, wherein said non-inflatable curtain and said inflatable device have a stored condition extending along the side structure of the vehicle adjacent to the vehicle roof.

4. Apparatus as defined in claim 1, wherein said non-inflatable curtain has a top edge connected to the side structure of the vehicle along the vehicle roof and an opposite bottom edge, said non-inflatable curtain having a front edge located adjacent to an A pillar of the vehicle and an opposite rear edge located adjacent to a C pillar of the vehicle.

5. Apparatus as defined in claim 4, wherein said inflatable device is an inflatable tube having a first end and an opposite second end, said first tether connecting said first end of said inflatable tube to said non-inflatable curtain at a location adjacent to said front edge and said bottom edge, said second tether connecting said second end of said inflatable tube to said non-inflatable curtain at a location adjacent to said rear edge and said bottom edge.

6. Apparatus as defined in claim 5, wherein said first tether extends from said first end of said inflatable tube through a first guide member fixed to the side structure of the vehicle at a first location, said second tether extending from said second end of said inflatable tube through a second guide member fixed to the side structure of the vehicle at a second location.

7. Apparatus as defined in claim 6 wherein said inflatable tube when deflated has a given diameter and a given length, said diameter of said inflatable tube increasing and said length of said inflatable tube decreasing when said inflatable tube is inflated.

8. Apparatus as defined in claim 7 wherein said inflatable tube when inflated tensions said first and second tethers which causes said non-inflatable curtain to be tensioned along said bottom edge.

9. Apparatus as defined in claim 6 wherein said first location is positioned forward of said front edge of said non-inflatable curtain as viewed relative to the direction of forward travel of the vehicle and said second location is located rearward of said rear edge of said non-inflatable curtain as viewed relative to the direction of forward travel of the vehicle.

10. Apparatus as defined in claim 6 wherein said first location is on an A pillar of the vehicle.

11. Apparatus as defined in claim 6 wherein said second location is on a C pillar of the vehicle.

12. Apparatus as defined in claim 1, further including a sensor for sensing a vehicle condition for which deployment of said non-inflatable curtain is desired, said sensor actuating said source to provide inflation fluid to said inflatable device.

13. Apparatus as defined in claim 1, wherein said source comprises an inflator which is actuatable to inflate said inflatable device.

* * * * *